Dec. 14, 1954   W. M. BALDRIDGE ET AL   2,696,977
LIVESTOCK FEED MIXER AND CONVEYER
Filed May 15, 1952   3 Sheets-Sheet 1
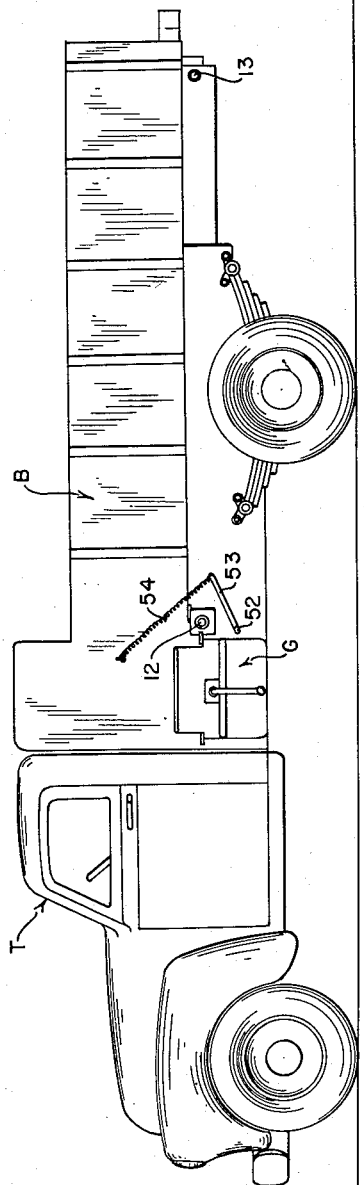
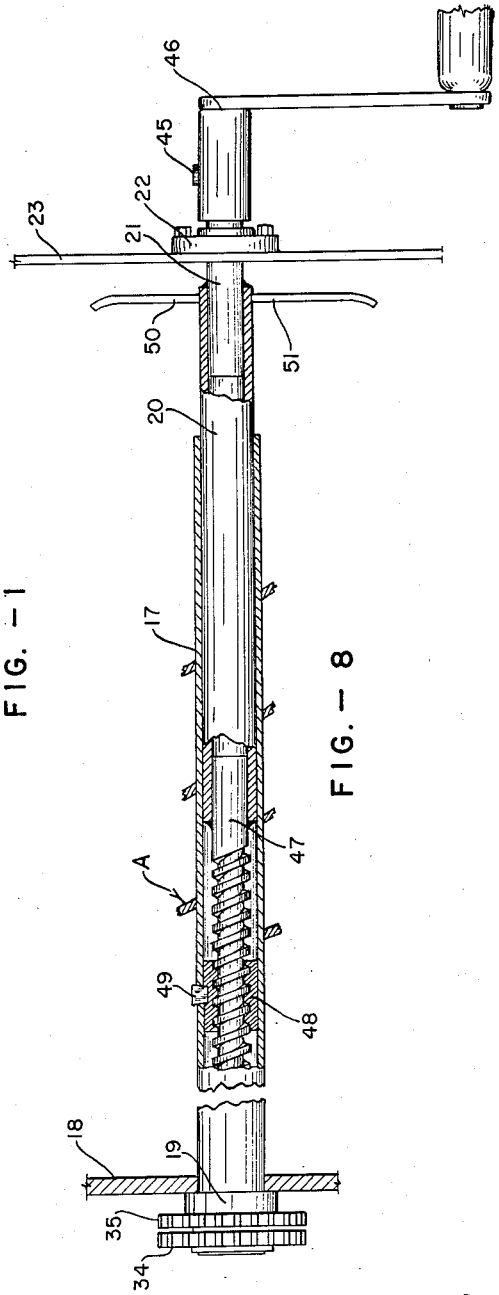
INVENTORS.
Walter M. Baldridge &
BY Kenneth R. Davisson
Lamphere and Van Valkenburgh
ATTORNEYS Dec. 14, 1954    W. M. BALDRIDGE ET AL    2,696,977
LIVESTOCK FEED MIXER AND CONVEYER
Filed May 15, 1952    3 Sheets-Sheet 2
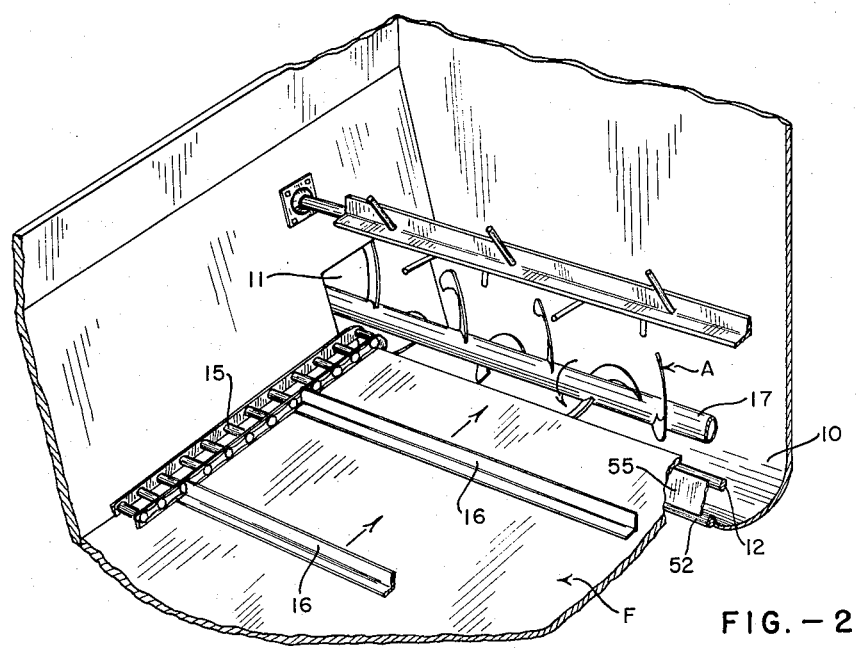
FIG.—2
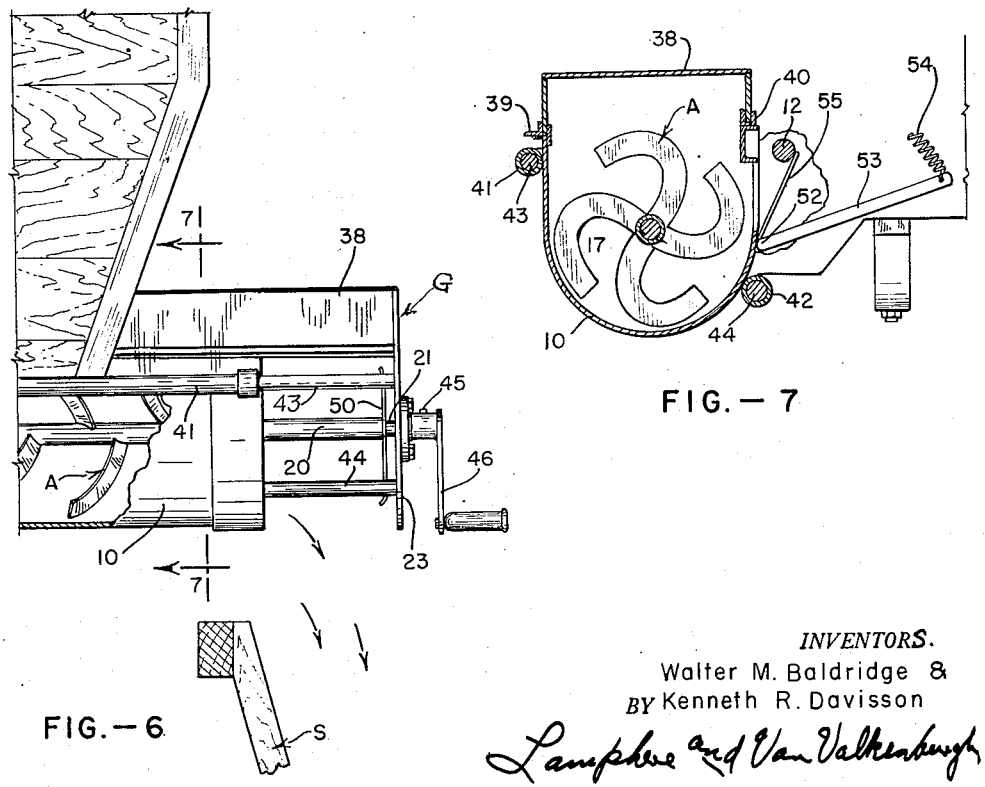
FIG.—6    FIG.—7
INVENTORS.
Walter M. Baldridge &
BY Kenneth R. Davisson
ATTORNEYS Dec. 14, 1954 W. M. BALDRIDGE ET AL 2,696,977
LIVESTOCK FEED MIXER AND CONVEYER
Filed May 15, 1952 3 Sheets-Sheet 3
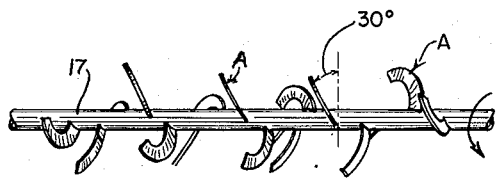
FIG.-3
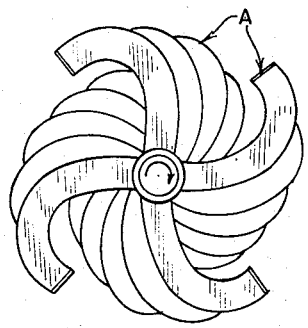
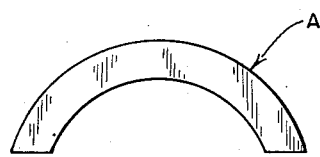
FIG.-4
FIG.-5
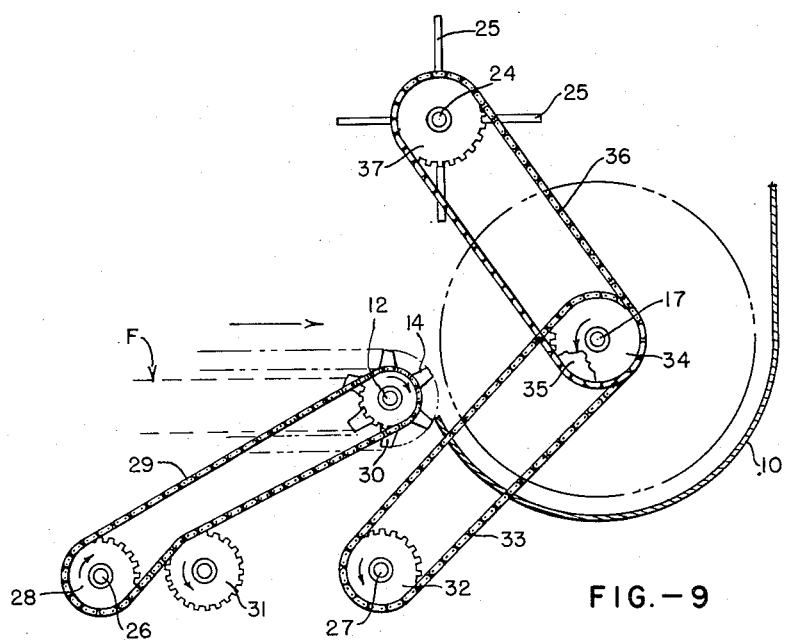
FIG.-9
INVENTORS.
Walter M. Baldridge &
BY Kenneth R. Davisson
*Lamphere and Van Valkenburgh*
ATTORNEYS United States Patent Office 2,696,977
Patented Dec. 14, 1954

2,696,977

LIVESTOCK FEED MIXER AND CONVEYER

Walter M. Baldridge and Kenneth R. Davisson, Severance, Colo.

Application May 15, 1952, Serial No. 287,992

13 Claims. (Cl. 259—10)

This invention relates particularly, by way of example, to mechanism for mixing livestock feed and conveying it to bunks or troughs where it can be available for consumption by animals, but the scope thereof is not intended to be so limited.

One of the objects of our invention is to provide improved means for mixing and conveying material.

Another object is to produce improved means for employment on a vehicle having a floor conveyor for efficiently mixing livestock feed and discharging it at one side of the vehicle for consumption by the livestock.

A further object is to construct an improved rotatable mixing apparatus or auger including a rotatable shaft and specially shaped arms arranged thereon to extend outwardly therefrom.

Still another object is to produce improved means for supplying material to a rotatable mixer so that uniform and efficient mixing can be accomplished.

A further object is to produce an improved discharge gate means for the mixing apparatus.

A still further object is to produce a discharge gate means for a vehicle mounted livestock feeder embodying mixing and conveying means of the auger type which will permit easy control so that the discharge opening can be closed when the feed is being transported, or opened to assure efficient depositing of the feed to bunks as the vehicle is driven parallel alongside thereof and the mixing and conveying means is operated.

Other objects of our invention will become apparent from the following description taken in connection with the accompanying drawings in which:

Figure 1 is a side view of a truck having a mixing and conveying means embodying our invention and being associated with the load carrying body and particularly designed for use in feeding livestock;

Figure 2 is a perspective view of a portion of the inside of the truck body showing the mixing auger and conveyor, the traveling floor and the rotatable bar for preventing overloading;

Figure 3 is a side view of the portion of the length of the auger;

Figure 4 is an end view of the auger showing the arrangement of the arms on the shaft;

Figure 5 is a side view of an arm before attachment, showing its curvature;

Figure 6 is an exterior side view, with parts broken away, of the discharge end of the mixing and conveying apparatus with control gate in open position;

Figure 7 is a sectional view taken on the line 7—7 of Figure 5 showing additional details;

Figure 8 is a view of the mechanism for moving the discharge gate to open and closed positions; and Figure 9 is an end view of suitable driving mechanism for the various rotatable elements.

Referring to the drawings in detail, there is shown, by way of example, our improved mixer and conveying means as being mounted upon an automobile so it can be employed in feeding livestock from the truck box as a truck is driven parallel alongside of feeder bunks for the livestock. In Figure 1 the truck is indicated by the letter T and has mounted thereon a material carrying compartment or box B. In the forward end of this box, which has a flat floor F therein, is a semi-circular trough 10 extending across the entire end of the box and having at one end thereof a discharge opening 11 in the side of the box.

The material which is to be mixed and conveyed for feeding in the bunks by our improved mixing and conveying means will be loaded directly into the box B and then fed to the mixing and conveying means at the front end of the box which is associated with the trough 10. The conveying means in the box can be of any well known structure, but is shown, by way of example, as involving a traveling floor apron. At the front end of the box is a cross shaft 12 mounted below the floor of the box and closely adjacent the trough. A similar cross shaft 13 (see Figure 1) is mounted at the rear end of the box below the floor. The shafts will have on their ends suitable sprockets 14 over which can be trained sprocket chains 15, one of said chains being shown in Figure 2 and one of the sprockets being shown in Figure 9. It will be understood, however, that there are two endless chains on opposite sides of the box and these chains are arranged to pass along the sides of the top of the floor to the front end thereof and then back to the rear end of the box beneath the floor. At suitable spaced intervals along the two endless chains there will be rigid cross bars 16 connected at their ends to the chains, such bars being shown in Figure 2. With these endless chains and cross bars, the bars will be dragged along the top surface of the floor and thereby feed the material into the trough at the forward end of the compartment as the chains move over and under the floor in a continuous manner.

One of the main features of our invention is the mixing and conveying structure associated with the trough 10. As shown in various views of the drawings, this structure is in the form of an auger and involves a hollow tubular shaft 17, one end of which will be journaled in a closed end wall 18 of the trough by a suitable bearing 19. The other end of this shaft 17 is arranged to telescope over a second tubular shaft 20 which will have welded in its outer end a solid shaft 21 arranged to be journaled by means of a bearing 22 in a plate 23 which will form part of a discharge control gate means for the discharge opening 11 of the trough. This control gate means is generally indicated by the letter G and will be later described in detail, because of the novel features embodied therein for controlling the discharge opening.

The tubular shaft 17 has mounted thereon a plurality of axially spaced laterally extending arms A, said arms all being of like construction. One of these arms is shown in Figure 5 to illustrate its shape as originally formed and prior to its being mounted upon the shaft, preferably by welding. The manner in which the arms are mounted on the shaft is illustrated in Figures 2, 3 and 4. Each arm is of semi-circular shape, being made from relatively thin material in relation to the width of the material so there will be a substantial face surface to the arm for pushing and mixing the material. The curvature of the arm is substantially circular and its length and the length of the arm after being formed will be approximately half the circumference of a circle. In the particular mixing auger shown, each arm A has a radius of curvature at its outer edge of approximately 3⅞ inches. The material from which the arm is formed has a thickness of 3/16 of an inch and a width of approximately 1¼ inches. The arm A can be made from straight, flat material and then shaped to the desired curvature in a suitable press which will curve the arm and at the same time finish it in a flat or planular condition.

Another feature of our mixing and conveying auger is the manner in which the arms are secured to the shaft 17. The arms will be placed upon the shaft in sets and, as shown in the particular auger, each set will comprise four arms. In the axial direction of the shaft the arms of each set will be spaced approximately 3 inches apart. Thus, for each foot length of the shaft there will be one set of four arms. Each arm of all the sets is mounted on the shaft so the plane in which it lies will be at an angle to a plane at right angles to the axis of the shaft. We have found that this angle should be between 20 and 40 degrees, with a preferred angle of approximately 30 degrees. In Figure 3 this angle is indicated for one of the arms. If the direction of rotation of the auger is as shown in Figure 2, then the auger will be constructed so the free end of each arm will be the trailing end and each arm will be inclined toward the discharge end of the trough by the desired angle.

In addition to the positioning of each arm on the shaft at an angle in the manner already described, the arms of each set will be attached to the shaft so that the corresponding arms of each set will define a spiral arranged on the shaft and thus will not be in axial alignment. This spiral arrangement is illustrated in Figures 3 and 4. A suitable spiral angle, that is, the angle by which each arm of a set is out of axial alignment with the corresponding arm of a preceding set, is preferably around 4 degrees. By reference to Figure 3, it will be noted there is illustrated four sets of the arms for the shaft. It will also be noted from this figure that the first arm of the second set of four arms, beginning from the right hand end of the auger, is set slightly out of alignment with the first arm of the first set. In a similar manner the first arm of the third set is out of alignment in the same direction around the shaft with respect to the first arm of the second set. This spiral arrangement of corresponding arms of each set is important in accomplishing a good mixing action of the material.

As the mixing auger rotates in the direction of the arrow, the inclination angle of each arm on the shaft will insure that the material being operated upon by the auger will be pushed toward the discharge end of the trough. Furthermore, with each arm having its free end as the trailing end, the arms will be moving in a direction toward the material which is being fed into the trough and because of this direction there will be a tendency to push some of the material away from the auger, instead of drawing it in, and thus there will be assurance that an excessive amount of material will not be forced into the auger to cause any serious overloading.

In order that material being moved into the mixing auger by the floor conveyor will not be pushed over the top of the auger and tend to "smother" it from the top, there is associated with the auger a rotatable shaft 24 having thereon a plurality of radially extending rods 25 in axially spaced relation and also in circumferentially spaced relation. This shaft 24 is positioned above the auger shaft 17 and slightly rearwardly thereof toward the rear end of the box, all as clearly illustrated in Figures 2 and 9.

The forward shaft 12 of the box conveyor, the shaft 17 of the auger and the shaft 24 above the auger will all be arranged to be driven from suitable power take-off means on the vehicle. As best shown in Figure 9, a suitable driving means is illustrated for these three shafts. The particular power take-off gearing associated with the vehicle transmission, however, is not illustrated. This gearing, however, will be arranged to drive two parallel shafts 26 and 27 mounted transversely of the vehicle below the box B. These two shafts will be driven at different speeds because it is desirable to have the floor conveyor move the material into the mixing auger at one speed and to rotate the mixing auger at another speed, which should be considerably higher, such as 400 to 600 R. P. M. The shaft 26 which drives the conveyor is provided with a sprocket 28 which is connected by a chain 29 to a sprocket 30 on the end of the shaft 12 of the floor conveyor. An idler sprocket 31 is employed to keep the chain tight. With this sprocket and chain arrangement and the shaft 26 rotating in the direction indicated by the arrow, it will be seen that the floor conveyor will be moved in a direction to move any material in the box toward the trough and into the auger.

The shaft 27 which is forward of the shaft 26 also is provided with a sprocket 32 and it is connected by a chain 33 to a sprocket 34 carried on the end of the auger shaft 17. If the shaft 27 is rotating in the direction indicated by the arrow, then the auger will be driven in the desired direction. To drive the shaft 24 and the arms thereon which are positioned above the auger, the auger shaft 17 will carry a sprocket 35 adjacent the sprocket 34 and this sprocket will be connected by a chain 36 to a sprocket 37 on the outer end of the shaft 24. It will be noted that the shaft 24, by this arrangement, will be rotated in the same direction as the auger shaft and the arms 25 carried by the shaft 24 will move toward the on-coming material being conveyed by the floor conveyor to the auger and push this material downwardly and into the auger below the top thereof. Thus, all material being fed into the auger must go into the auger below the plane of the top of said auger. The shaft 24 and arms thereon acting to force material down and into the mixing auger tends to overcome the possibility of the arms of the auger pushing out the material. The net result will be an efficient feeding to the auger without overloading.

Another feature of our invention is the manner of controlling the discharge opening of the trough so that proper discharge of the mixed material into a livestock feeding bunk can be accomplished as the truck is driven alongside. This discharge control means or gate means, already referred to and indicated generally by the letter G, is illustrated in Figures 1, 6, 7 and 8 and includes the plate 23 on which the end of the auger shaft 17 is supported. The plate 23 is of a size to close the discharge opening of the trough, which it will be noted from Figure 6 has a portion extending outwardly beyond the side of box B. At the top of the plate 23 is a box-like cover structure 38 which extends toward the box and overlies the open top portion of the trough 10. The top edges of the trough, as best shown in Figure 7, have U-shaped flanges 39 and 40 thereon in which the bottom edges of the side walls of the box-like cover 38 can slide and be guided. The discharge opening 11 in the box B will be of a size to receive the box-like cover 38 when it is moved inwardly. To further support and guide the plate 23 during its movement with respect to the open end of the trough, there are provided two tubular members 41 and 42 on opposite sides of the trough and permanently fixed to the trough. These tubular members act as guides for support rods 43 and 44 which are carried by the plate 23. With this construction it will be seen that the plate 23 can be moved inwardly and outwardly to open and close the discharge opening of the trough and at the same time act as a complete support for one end of the shaft 17 of the auger mixer.

If desired, the plate 23 can be moved inwardly and outwardly merely by a hand sliding movement. However, it may be desirable to provide a power means for accomplishing the opening and closing of the plate and in Figure 8 such a power means is disclosed. The short shaft 21 previously referred to and mounted by means of the bearing 22 to the plate 23 is arranged to extend outwardly beyond the plate and is provided with a cross pin 45 which can receive the end of a hand crank 46 for turning said shaft as desired. On the inner end of the hollow tubular shaft 20, which telescopes in the auger shaft 17 of the auger mixer, there is provided a threaded rod 47 which is screwed into a tubular nut 48 secured to the inside of the auger shaft 17 by a key 49.

With this arrangement it will be seen that by turning connected shafts 20 and 21 by means of the crank, the shafts can be moved longitudinally with respect to the auger mixer and since the bearing 22 and the plate 23 will be arranged to have no relative longitudinal movement with respect to the shafts, the plate 23 can be moved inwardly and outwardly as desired. When the mixer is not being operated, the plate 23 can be moved to closed position where it will remain in fixed condition and there will be no danger of any spilling of material from the box when it is being transported. When the material is ready to be placed in the bunkers, the plate 23 is moved to its open position, as shown in Figure 2. If shafts 12, 17 and 24 are now rotated, mixing is accomplished and the mixed material will be forced out of the end of the trough and dropped into the feeding bunkers which were fragmentarily illustrated in Figure 6 and indicated by the letter S.

In order to further assist in the discharge of mixed material downwardly when the gate means is opened, the tubular shaft 20 adjacent the inside of the plate is provided with two diametrically extending paddle arms 50 and 51. Since these paddle arms turn with the auger, they will prevent mixed feed from being pushed against the plate 23 and also aid in "kicking" the mixed feed downwardly into the bunks.

In the floor conveying arrangement for the trough 10, it will be necessary to have a space between the end of the floor and the trough in order that the conveyor chains 15 and cross bars 16 can pass around the end of the floor. This space, if not controlled, permits loss of mixed feed. To prevent this, a special structure is employed. Below the shaft 12 at the forward end of the floor conveyor there is mounted a parallel shaft 52 which will have on its outer end an arm 53 (Figure 7) acted upon by a coil spring 54. This shaft 52 has fixed thereto a plate 55 extending all the way across the floor between the chains 15 of the conveyor, with such height that it can engage against the rear side of shaft 12, all as illustrated in Figures 2 and 7. The engagement of the plate with the shaft is yieldably maintained by the action of the spring 54. With this arrangement, any material which is carried over the front edge of the floor by the floor conveyor will hit against the plate and be directed into the trough. As each cross connecting bar 16 of the floor conveyor passes around the front end of the floor to make its return trip to the rear of the box, it will hit against the plate and force it rearwardly and downwardly against the action of the spring 54 and thus pass the plate.

From the foregoing description of our mixing and conveying structure, it will be seen that the operator can fill his truck box up with feed material and transport it directly to the feed bunkers where it can be simultaneously mixed and discharged into the bunkers as the truck is driven in parallel relation alongside the bunkers. When mixing and discharging is desired, the gate means will be moved to open position and then the floor conveyor, the mixing auger and the shaft 24 caused to be driven by the engine of the truck as the vehicle is moved forwardly. The floor conveyor then moves feed in the box into the trough and the mixing auger will cause such feed to be simultaneously mixed and conveyed into the bunks. Overloading will be prevented by the action of the rotating arms 25 carried on the shaft 24 above the auger. The auger will perform a thorough mixing action, regardless of what type of feed material is being employed. Grains, ensilage, beet pulp, cut hay and other materials, whether in dry form or in form having a fairly high moisture content, are all thoroughly mixed and blended by the mixing auger. The stock is thus assured of having a balanced diet.

We desire it to be understood that our mixing and conveying apparatus need not be mounted on a vehicle or have the auger thereof associated with a floor conveyor such as illustrated. Mixing can be accomplished without moving the vehicle and the mixing auger can be placed in some stationary place and fed as desired by hand or otherwise as, for example, through a hopper above the auger. Thus, being aware of the possibility of modifications in the particular mixing and conveying structure disclosed and the various uses of the novel mixing auger, all without departing from the fundamental principles of our invention, we desire it to be understood that the scope of said invention is not to be limited in any manner except in accordance with the appended claims.

What is claimed is:

1. In combination with a vehicle having a compartment and means for conveying material in said compartment to one end thereof, of a trough at said end extending crosswise of the lengthwise axis of the vehicle and having a curved bottom and an open end, a mixing and conveying means associated with the trough including a rotatable shaft extending lengthwise in the trough and curved laterally extending arms mounted thereon in axially spaced relation with the outer end of each arm being axially spaced from its attached end, each of said arms also having such curvature and being so related to the curved surface of the trough that, as the shaft is rotated in such a direction that the outer ends of the arms will be trailing, a considerable length of the curved edges of the arms will move closely adjacent the curved bottom of the trough and mix the material in the trough and simultaneously move the material toward the open end of the trough by auger-like action, means for rotating the shaft, and means at the open end of the trough for discharging the material downwardly outside the compartment.

2. In combination with a vehicle having a compartment and means for conveying material in said compartment to one end thereof, of a trough at said end extending crosswise of the lengthwise axis of the vehicle and having a curved bottom and an open end at the side of the compartment, a mixing and conveying means associated with the trough including a rotatable shaft extending lengthwise in the trough and curved laterally extending arms mounted thereon in axially spaced relation with the curvature of each arm being from the shaft outwardly and the outer end of each arm being axially spaced from its attached end so that as the shaft is rotated in one direction the arms will mix the material in the trough and simultaneously move the material toward the open end of the trough by auger-like action, means for rotating the shaft, a closure member for the open end of the trough, means for mounting the closure member for movement axially to open and closed position, means for rotatably supporting the shaft on the closure member, and paddle means adjacent the closure member and rotatable with the shaft for aiding in discharging mixed material conveyed to the open end of the trough.

3. In means for mixing and conveying material, a trough having a curved bottom and an opening at one end, a rotatable shaft extending lengthwise in the trough and having curved laterally extending arms mounted thereon in axially spaced relation with the curvature of each arm being from the shaft outwardly and the outer end of each arm being axially spaced from its attached end so that as the shaft is rotated in one direction the arms will mix the material in the trough and simultaneously move the material toward the open end of the trough by auger-like action, means for rotating the shaft, gate means mounted for movement in the axial direction of the shaft for opening and closing the open end of the trough, and means for rotatably supporting one end of the shaft on the gate means yet permitting the gate to assume open or closed positions so that material moved out of the open end will be free of any obstruction.

4. In combination with a vehicle having a compartment and means for conveying material in said compartment to one end thereof, of a trough at said end extending crosswise of the lengthwise axis of the vehicle and having a curved bottom and open at one end to the outside of the compartment, a mixing and conveying means associated with the trough including a rotatable shaft extending lengthwise in the trough and curved laterally extending arms mounted thereon in axially spaced relation with the curvature of each arm being from the shaft outwardly and the outer end of each arm being axially spaced from its attached end so that as the shaft is rotated in one direction the arms will mix the material in the trough and simultaneously move the material toward the open end of the trough by auger-like action, means for rotating the shaft, a closure member for the open end of the trough, means for mounting the closure member for movement outwardly axially of the shaft to thereby provide an opening for discharging material, and means for rotatably mounting the end of the shaft in the closure member in a manner permitting movement of the closure member to open and closed position and insuring unobstructed discharge movement of mixed material.

5. In combination with a vehicle having a compartment and means for conveying material in said compartment to one end thereof, of a trough at said end having a curved bottom, a mixing and conveying means associated with the trough including a rotatable shaft extending lengthwise in the trough and curved laterally extending arms mounted thereon in axially spaced relation with the outer end of each arm being spaced from its attached end so that as the shaft is rotated in one direction the arms will mix the material in the trough and simultaneously move the material toward one end of the trough by auger-like action, means for rotating the shaft, and means at the end of the trough for discharging the material downwardly outside the compartment, said last named means comprising a plate for closing the end of the trough, means for mounting the plate for movement outwardly from the trough end to thereby open same for discharge of material, and means carried by the plate for providing a cover between the top of the plate and the top trough exterior of the compartment so that discharged material can pass only downwardly at the exterior end of the trough.

6. In mixing and conveying apparatus, a compartment having a trough at one end, means in the trough for conveying material placed therein to one end of the trough for discharge therefrom, a second conveyor means associated with the floor of the compartment for conveying material therein to the trough and comprising a rotatable shaft adjacent the trough and another rotatable shaft spaced therefrom in parallel relation, spaced endless members trained over the shafts and rigid members connecting the endless flexible members, and means for preventing material at the trough from being carried away from the trough by the floor conveying means after it turns over the shaft at the trough, said last named means comprising a member mounted for yieldable engagement with the trough shaft on its side remote from the trough and capable of movement away from the shaft when engaged by a rigid connecting member to thereby allow passage of said rigid connecting member.

7. In mixing and conveying apparatus, a compartment having a trough at one end, means in the trough for mixing material and conveying it to one end of the trough for discharge therefrom, a conveyor means associated with the floor of the compartment for conveying material therein to the trough and comprising a rotatable shaft adjacent the trough and another rotatable shaft spaced therefrom in parallel relation, spaced endless members trained over the shafts and rigid members connecting the endless flexible members, and means for preventing material at the trough from being carried away from the trough by the floor conveying means after it turns over the shaft adjacent the trough, said last named means comprising a plate of a length to extend between the endless flexible members and being pivoted below the said trough shaft and arranged to have its outer free end engageable with the trough shaft on its side remote from the trough, and spring means acting on the plate to bias it into engagement with the trough shaft.

8. In means for mixing and conveying material, a trough, mixing and conveying means in the trough comprising a shaft mounted lengthwise in the trough, means providing a controlled discharge opening for the end of said trough comprising a gate means mounted on the trough for axial movement, means for rotatably mounting the shaft on the gate means, and means for moving the gate means to open and closed position comprising a nut carried by the shaft, and a screw rotatably carried by the gate means, said screw constituting a support between the gate means and shaft.

9. In a mixing and conveying means, an elongated trough having a curved bottom and a discharge opening at one end, a rotatable shaft mounted in the trough and extending lengthwise thereof, a plurality of arms mounted on said shaft and extending laterally therefrom, each of said arms being made of flat material of substantially uniform width throughout its length and positioned to lie in a single plane and having a semi-circular curvature with one end being secured to the shaft in a manner that the other outer end will be in a position closer to the discharge end than said secured end, and means for rotating the shaft in a direction so that the outer ends of the arms are the trailing ends.

10. In a mixing and conveying means, an elongated trough having a curved bottom and a discharge opening at one end, a rotatable shaft mounted in the trough and extending lengthwise thereof, a plurality of arms mounted on said shaft and extending laterally therefrom, each of said arms being made of flat material of substantially uniform width throughout its length and positioned to lie in a single plane and having a semi-circular curvature with the arm being secured to the shaft in a manner that the plane of the arm is at an angle between 20 degrees and 40 degrees to a plane which is at right angles to the axis of the shaft with the outer end being closer to the discharge end than the secured end, and means for rotating the shaft so that the outer ends of the arms are the trailing ends.

11. In a mixing and conveying means, an elongated trough having a curved bottom and a discharge opening at one end, a rotatable shaft mounted in the trough and extending lengthwise thereof, a plurality of arms mounted on said shaft and extending laterally therefrom, each of said arms being made of flat material with the major surface lying in a single plane and having a substantial semi-circular curvature with one end being so secured to the shaft that the plane of the major surface of the arm will have an acute angle with a plane at right angles to the shaft axis, said arms being arranged in sets with the arms of each set being spaced apart equally in an axial direction and also equally angularly spaced in a circumferential direction, and each like arm of each set being so arranged that they have a spiral relation to the shaft, and means for rotating the shaft so that the outer ends of the arms are the trailing ends.

12. In a mixing and conveying means, an elongated trough having a curved bottom and a discharge opening at one end, a rotatable shaft mounted in the trough and extending lengthwise thereof, a plurality of axially spaced arms mounted on said shaft and extending laterally therefrom, each of said arms being flat and lying in a single plane which is at an angle to a plane positioned at right angles to the shaft axis and having a semi-circular curvature with one end being secured to the shaft in a manner that the other outer end will be in a position closer to the discharge end of the trough than said secured end, said arms being arranged in sets with the arms of each set being equally spaced circumferentially on the shaft and like arms of each set being out of axial alignment, and means for rotating the shaft in a direction so that the outer ends of the arms are the trailing ends.

13. In means for mixing, conveying and discharging material, an elongated mixing chamber, mixing and conveying means in the chamber for moving the material toward one end and comprising a shaft mounted lengthwise in the chamber, and means providing a controlled discharge opening for the end of said chamber comprising a gate means, means for mounting the gate means on the end of the chamber for sliding movement in the axial direction of the shaft toward and away from the chamber, and means for rotatably mounting one end of the shaft in the gate means in a manner to fully support said shaft end yet permit the sliding movement of the gate means.

References Cited in the file of this patent

UNITED STATES PATENTS

| Number | Name | Date |
|---|---|---|
| 188,094 | Berdan | Mar. 6, 1877 |
| 488,098 | Tritz | Dec. 13, 1892 |
| 1,008,089 | Synck | Nov. 7, 1911 |
| 1,177,200 | Mashek | Mar. 28, 1916 |
| 2,018,618 | Schmidt | Oct. 22, 1935 |
| 2,112,317 | Valentine | Mar. 29, 1938 |
| 2,221,401 | Konicek | Nov. 12, 1940 |
| 2,285,765 | Carswell | June 9, 1942 |